United States Patent [19]

Schaeffer

[11] 4,173,310

[45] Nov. 6, 1979

[54] ROTARY CUTTER BLADE

[75] Inventor: Robert L. Schaeffer, LeRoy, N.Y.

[73] Assignee: General Electric Company, New York, N.Y.

[21] Appl. No.: 898,908

[22] Filed: Apr. 24, 1978

[51] Int. Cl.$^2$ ............................................. B02C 18/12
[52] U.S. Cl. .................................................. 241/282.1
[58] Field of Search ............. 241/199.12, 282.1, 282.2, 241/292.1

[56] References Cited

U.S. PATENT DOCUMENTS

| | | | |
|---|---|---|---|
| 2,894,551 | 7/1959 | Otto | 241/199.12 X |
| 3,053,297 | 9/1962 | Broundler | 241/282.2 X |
| 3,330,317 | 7/1967 | Schaller | 241/282.2 |
| 3,461,933 | 8/1969 | Mantelet | 241/199.12 |
| 3,491,818 | 1/1970 | Schaller | 83/666 |
| 3,493,022 | 2/1970 | Mantelet | 241/199.12 |
| 3,540,505 | 11/1970 | Buck | 241/292.1 |
| 3,892,365 | 7/1975 | Verdun | 241/282.1 |

FOREIGN PATENT DOCUMENTS 1157957 11/1963 Fed. Rep. of Germany ........ 241/292.1
1167149 11/1958 France .

*Primary Examiner*—Howard N. Goldberg
*Attorney, Agent, or Firm*—John F. Cullen; George R. Powers; Leonard J. Platt

[57] ABSTRACT

A rotary cutter blade for use in an unfluted constant diameter bowl of a small series motor driven food processor with a rotatable hub is provided where the blade comprises a cutting surface formed in two distinct curvatures of substantially equal radii with a first inner surface including a long circular outwardly convex cutting edge having its center of curvature offset a given amount from the hub axis and terminating inwardly of the bowl inner surface and having a second outer surface of a short circular outwardly convex cutting edge with its center of curvature being a lesser amount offset from the hub axis and extending from tangency with the bowl inner surface to terminate in a substantially pointed intersection with the first cutting edge and the first and second cutting surfaces having lengths substantially in the ratio of 3 to 1 where the particularly formed blade permits use of a series motor without stalling or jamming by wedged pieces of food between the blade and bowl. Preferably, the cutter is provided in pairs of diametrically opposite cutters extending from the hub for balanced operation with the opposite cutters being offset vertically in different planes.

4 Claims, 2 Drawing Figures

ROTARY CUTTER BLADE

BACKGROUND OF THE INVENTION

1. Field of the Invention

The invention herein pertains to a particularly shaped cutter blade for use in an unfluted or smooth inner surface diameter bowl of a food processor having a small series motor driving a rotatable hub in the food processor. The blade is formed of particularly shaped cutting surfaces such that the cutter blade permits use of a series motor without stalling or jamming by wedged pieces between the blade and bowl.

2. Description of the Prior Art

Rotary cutting blade food processors, which operate in the area of 2,000 rpm between mixers and blenders, have come into wide use. Rotary blade food processors are old in the art and are available for commercial use as large, high capacity machines with induction motors. Even the kitchen appliance food processor may use induction motors and the use thereof has resulted in an expensive and heavy unit. Because of the success of such a unit, it was inevitable that a lighter weight, cheaper motor arrangement would appear and it has in the use of a geared down series motor. Because induction and series motors have substantially different performance characteristics, particularly concerning speed regulation and torque, the type of blade normally used with induction motor processors is marginal when used on a series motor powered procesor. The difficulty with a conventional blade, such as in U.S. Pat. Nos. 3,493,022 and 3,491,818, is that they either require limited size blades not completely sweeping the bowl or require the use of a substantially constant curve relative to the side of the bowl permitting jamming. If used with induction motor processors, such blades may be adequate but their use is marginal when used in a small series motor powered food processor. With such normal blade structure having the constant curve relationship or even multiple curves, relatively large pieces of food can be created to wedge and stall an induction motor without excessive reaction on the base. A small series motor driven blade which has a very high stall torque will not stall on wedge pieces, it simply slows down and keeps going, sliding the wedged piece around the bowl thus resulting in neither stalling or cutting but causing the entire processor to move or "walk" on the counter. Thus, double curved cutting edges are common in rotary food processors. However, there is need for a specific blade that is compatible for use with a small series motor, that allows the use of a smooth inner surface bowl for more easy cleaning, and that allows for efficient mincing or cutting at processor speeds of 1,500-2,400 rpm while doing this over the entire inner surface of the bowl.

SUMMARY OF THE INVENTION

Briefly described, the invention is directed to a rotary cutter blade for use in an unfluted or smooth constant diameter bowl of a small series motor driven food processor with a rotatable hub which is provided with a cutting blade comprising a cutting surface that is formed in two distinct curvatures of substantially equal radii with a first inner suface including a long circular outwardly convex cutting edge having its center of curvature offset a given amount from the hub axis and terminating inwardly of the bowl's smooth inner surface and having a second outer surface of a short circular outwardly convex cutting edge with its center of curvature being a lesser amount offset from the hub axis and extending from tangency with the bowl smooth inner surface to terminate in a substantially pointed intersection with the first cutting edge said intersection not over 0.20" from the bowl inner periphery and having the first and second cutting surfaces with lengths substantially in the ratio of 3 to 1 whereby the particularly formed blade permits a sweep of about 97% of the bowl inner diameter and uses a small series motor without stalling or jamming by wedging pieces of food between the blade and bowl. The cutter blade is provided in pairs of diametrically opposite cutters extending from the hub so there is balanced operation with the opposite cutters being offset vertically in different planes. Thus the main object of the invention is to provide such a cutter blade to achieve these objectives when used in combination with a relatively small series motor and to do this by using a blade of particularly formed geometry.

DETAILED DESCRIPTION

Figure 1:
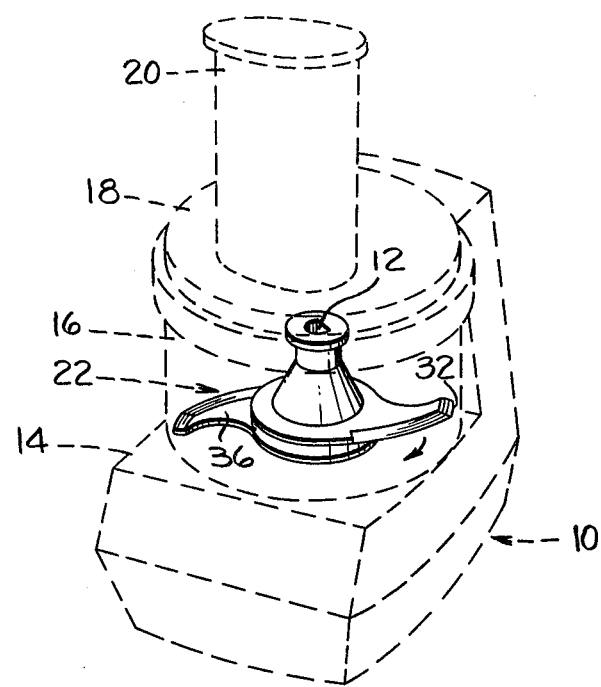
FIG. 1 is a phantom isometric view of a typical food processor showing the rotary cutter blade in solid lines.

The invention is directed to a particularly formed cutter blade for use with a food processor where it is possible to obtain mincing uniformity at speeds of 1,500-2,400 rpm—the operating speed of a common kitchen food procesor. Referring to FIG. 1, there is shown a food processor comprising a base housing 10 which may contain an inexpensive compact small series motor that drives shaft 12 either direct or through a belt in normal fashion. The term "small" series motor as used and claimed herein is directed to a standard series motor having an armature diameter no greater than 1⅜". This limitation is set to keep the food processor, with which it is used in combination, all within a cost limit that permits a standard size processor to perform efficiently all the required and expected functions without increasing the motor size above this defined "small" series motor. In other words, this blade design enables a reduction in the size and cost of an inexpensive series motor with no decrease in the size or performance of the food processor. For mincing foods, base housing 10 has a suitable platform 14 on which is mounted processor bowl 16 covered by lid 18 which is generally operable through an interlock such as shown in U.S. Pat. No. 4,111,372 of common assignment so that the processor cannot be operated unless the lid is securely in place to protect the user from the internal cutters 22. Food is directed into the bowl interior through the conventional chute 20 where spinning cutters 22 or discs, not shown, impart different cutting operations. As thus far described, the food processor is quite conventional.

Figure 2:
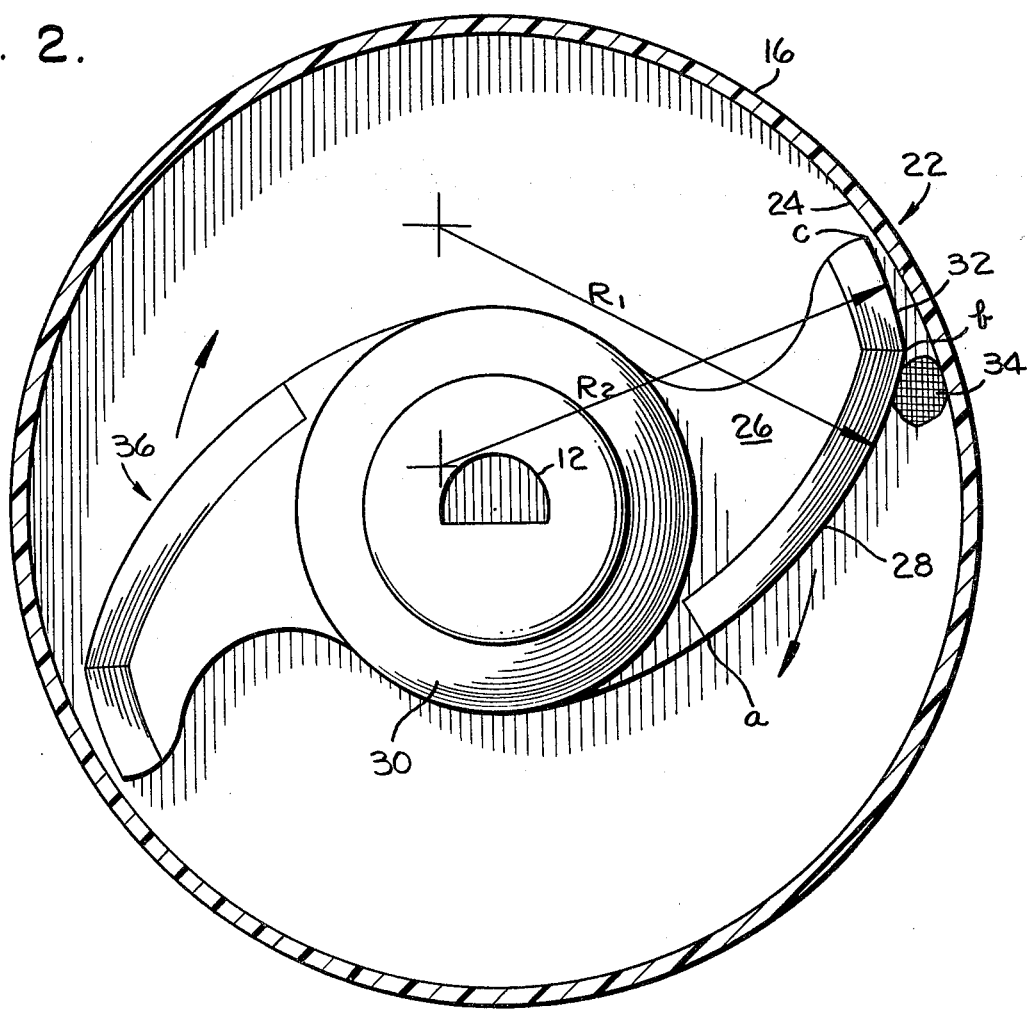
FIG. 2 is an enlarged top plan view of the shape of the cutter blade in position in the bowl.

In conventional food processors it is necessary to use either an induction or series motor but each has its disadvantages and both have substantially different performance characteristics especially on speed regulation and torque. If a conventional blade using a constant curve relative to the side of the bowl is used, it inherently presents a cutting action wherein relatively large pieces of meat or vegetables can wedge between the cutter and the bowl and stall an induction motor. In other words, small cuttings or mincing is not efficiently done with an induction motor and if large pieces get jammed the motor simply stops. However, a series motor has a very high stall torque so it does not stall on wedged pieces, it simply slows down and keeps going moving the wedge piece around the bowl so that it neither stall nor cuts but causes the entire processor to move on the counter top. My design of cutter blade permits the blade to uniformly mince food while still allowing the use of a smooth inner surface on the bowl for easier cleaning. Further, it permits the use of a compact low cost small series motor as defined without reducing the processor size and allows the blade span to cover over 97% of the inside diameter of the bowl for the above noted uniform mincing. To achieve these features, as shown in FIG. 2, bowl 16 is provided with a smooth unfluted constant diameter inner surface. Thus, the bowl is easily cleaned after using. For cutting and mincing to a uniform small size, while being driven by a defined compact small series motor preferably through a transmission, a rotary cutter blade 26 is provided with a peripheral cutting surface formed in two distinct inner and outer curvatures of substantially equal radii. There is provided a first radially inner cutting surface 28 that includes a long circular outwardly convex cutting edge a-b and having a center of curvature $R_1$. For the proper cutting as will become clear, the center of curvature of $R_1$ is offset from the axis of shaft 12 on which is mounted the cutter carrying hub 30. To prevent jamming, the cutting edge a-b terminates at b inwardly of the bowl inner surface 24. Cooperating with the first cutting edge a-b is a second surface radially outward and comprising an outer cutting surface 32 including a shorter circular outwardly convex cutting edge b-c. This has a radius $R_2$ whose center is also offset from shaft 12 or the axis of hub 30 by a lesser amount i.e. it is closer to the central axis and the cutting edge b-c extends from a tangency with the bowl inner surface 24 to terminate in a substantially pointed intersection at b with the first cutting edge a-b. With the small defined series motor and the particularly formed cutter this b intersection is at a distance not greater than 0.2 inches from the bowl inner periphery. If it is a greater distance from the inner periphery then a series motor larger than the defined "small" series motor is required. Thus, there is formed a dual curvature cutting surface with each of the curvatures having generally equal radii $R_1$ and $R_2$ but having different centers as shown in FIG. 2. It has been found that the lengths of the dual cutting surfaces achieve the efficient mincing and non-jamming when they are substantially in the ratio of 3 to 1 i.e. cutting edge a-b is about three times as long as cutting edge b-c.

With this particularly formed cutter blade as used with the defined "small" series motor, there is excellent mincing uniformity and any large pieces of food are easily cut by cutting edge a-b and the relatively narrow spacing at c between the outside diameter of the rotating cutter 22 and the inside diameter 24 provides this mincing uniformity while the narrow spacing between b and inner surface 24 assures that food pieces 34 will be chopped or minced without jamming whereby the entire dual curvature relation permits the use of the defined small series motor. Such a motor has very high stall torque and any small pieces of food 34 cannot wedge between the blade and the bowl and will be immediately chopped.

In order to provide balanced operation, a second dual curvature cutter 36, identical to cutter 22, is disposed to extend diametrically oppositely from hub 30 and the two cutters are mounted in different vertically disposed planes as shown in FIG. 1 as is common in a food processor.

Thus, the particularly formed rotary cutter blade assembly of the geometry described, permits the use of compact low cost small series motors as defined that can handle a wide range of food stuffs and not stall on pieces that become wedged between the cutter and bowl and merely get pushed around inside of the bowl. The dual cutting surface approach to the blade having the double angle of cutting with the pointed intersecton b falling in the defined range ensures that on the outside of the second cutting surface 32 only small pieces can get in which can be cut. No large pieces can get in to jam. Thus, pieces too large cannot get in between b and c to jam between the cutter and those that can get in i.e. those cut by a-b, to jam between the cutter are small enough to be cut for uniform mincing. The cutter is able to sweep substantially the entire bowl periphery—about 97%—so that the food can be minced into small pieces since there are no ribs in the jar. Thus, it is possible to sweep to the inside periphery of the bowl to chop all the food stuff. Consequently, the particularly formed cutter blade assembly avoids the need for an induction motor in a full size processor and permits use of a small series motor with a very wide sweep substantially to the inside of the bowl inner diameter for uniform mincing of articles placed in the bowl.

While I have hereinbefore described a preferred form of the invention, obvious equivalent variations are possible in light of the above teachings. It is therefore to be understoood that, within the scope of the appended claims, the invention may be practiced otherwise than as specifically described, and the claims are intended to cover such equivalent variations.

I claim:

1. A rotary cutter blade for use in an unfluted constant diameter bowl of a defined small series motor driven food processor with a rotatable hub mounted on a vertically oriented drive shaft, said blade comprising,
    a cutting surface formed in two distinct curvatures of substantially equal radii comprising, a radially inner first surface and a radially outer second surface,
    said first inner surface including a long circular outwardly convex cutting edge with its center of curvature offset a given amount from the hub axis and terminating inwardly of the bowl inner surface, and
    said second outer surface including a short circular outwardly convex cutting edge with its center of curvature offset a lesser amount than said first from the hub axis and extending from tangency with the bowl inner surface to terminate in a substantially pointed intersection with said first cutting edge,
    said intersection being at a distance not over 0.2" from the bowl inner periphery whereby such blade formation permits use of said defined small series motor to sweep substantially 97% of the unfluted bowl inner diameter without stalling or jamming by wedged pieces between blade and bowl.

2. A cutter as described in claim 1 wherein the first and second cutting surfaces have lengths substantially in the ratio of 3 to 1.

3. A cutter as described in claim 2 wherein a pair of two curvature cutting surfaces is provided, each extending diametrically oppositely from said hub.

4. A cutter as described in claim 3 wherein the oppositely extending cutting surfaces are disposed in different vertically spaced planes.

* * * * *